United States Patent
Liu et al.

(10) Patent No.: US 11,386,276 B2
(45) Date of Patent: **\*Jul. 12, 2022**

(54) METHOD AND SYSTEM FOR LANGUAGE AND DOMAIN ACCELERATION WITH EMBEDDING ALIGNMENT

(71) Applicant: International Business Machines Corporation, Armonk, NY (US)

(72) Inventors: Xiaotong Liu, San Jose, CA (US); Anbang Xu, San Jose, CA (US); Yingbei Tong, San Jose, CA (US); Rama Kalyani T. Akkiraju, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 451 days.

This patent is subject to a terminal disclaimer.

(21) Appl. No.: 16/422,133

(22) Filed: May 24, 2019

(65) Prior Publication Data
US 2020/0372115 A1    Nov. 26, 2020

(51) Int. Cl.
| G06F 40/30 | (2020.01) |
| G06F 40/58 | (2020.01) |
| G06F 40/211 | (2020.01) |
| G06F 40/284 | (2020.01) |

(52) U.S. Cl.
CPC ............ *G06F 40/58* (2020.01); *G06F 40/211* (2020.01); *G06F 40/284* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| 5,768,603 A | 6/1998 | Brown et al. |
| 6,885,985 B2 | 4/2005 | Hull |
| 7,672,830 B2 * | 3/2010 | Goutte .................. G06F 40/45 704/4 |
| 8,676,791 B2 * | 3/2014 | Maedera ............... G06F 40/47 707/723 |

(Continued)

FOREIGN PATENT DOCUMENTS

WO   WO 2014107265 A1   7/2014

OTHER PUBLICATIONS

Ruder et al., title={A survey of cross-lingual word embedding models}, journal={Journal of Artificial Intelligence Research}, 2019 vol.={65}, pp. 569-631 (Year: 2019).*

(Continued)

*Primary Examiner* — Lamont M Spooner
(74) *Attorney, Agent, or Firm* — Terrile, Cannatti & Chambers, LLP; Michael Rocco Cannatti (57) ABSTRACT

A method, system and a computer program product are provided for aligning embeddings of multiple languages and domains into a shared embedding space by transforming monolingual embeddings into a multilingual embeddings in a first shared embedding space using a cross-lingual learning process, and then transforming the multilingual embeddings into cross-domain, multilingual embeddings in a second shared embedding space using a cross-domain learning process.

15 Claims, 5 Drawing Sheets

(56) References Cited

U.S. PATENT DOCUMENTS

| | | | |
|---|---|---|---|
| 8,775,154 B2* | 7/2014 | Clinchant | G06F 16/3337 |
| | | | 707/999.005 |
| 9,002,695 B2* | 4/2015 | Watanabe | G06F 40/169 |
| | | | 704/4 |
| 9,424,253 B2 | 8/2016 | Alshinnawi et al. | |
| 9,779,085 B2* | 10/2017 | Wick | G06F 40/44 |
| 9,922,025 B2 | 3/2018 | Cross, III et al. | |
| 9,947,314 B2 | 4/2018 | Cao et al. | |
| 9,959,271 B1 | 5/2018 | Goyal et al. | |
| 10,339,440 B2* | 7/2019 | Trask | G06N 3/02 |
| 10,579,940 B2* | 3/2020 | Jagmohan | G06N 20/00 |
| 10,642,919 B2* | 5/2020 | Jagmohan | G06N 3/0454 |
| 10,657,189 B2* | 5/2020 | Jagmohan | G06N 3/084 |
| 10,796,107 B2* | 10/2020 | Kong | G06F 40/295 |
| 11,003,867 B2* | 5/2021 | Singh | G06N 3/0445 |
| 2004/0133574 A1* | 7/2004 | Bradford | G06Q 10/10 |
| 2005/0187931 A1* | 8/2005 | Cofino | G06F 16/3344 |
| | | | 707/999.005 |
| 2010/0153332 A1 | 6/2010 | Rollins et al. | |
| 2011/0258229 A1* | 10/2011 | Ni | G06F 16/24 |
| | | | 704/8 |
| 2013/0311166 A1 | 11/2013 | Yanpolsky | |
| 2015/0095017 A1 | 4/2015 | Mnih et al. | |
| 2015/0331854 A1 | 11/2015 | Alshinnawi et al. | |
| 2016/0092427 A1* | 3/2016 | Bittmann | G06F 16/35 |
| | | | 704/9 |
| 2016/0350288 A1* | 12/2016 | Wick | G06F 40/44 |
| 2017/0083508 A1* | 3/2017 | Dixon | G06F 40/58 |
| 2017/0161633 A1* | 6/2017 | Clinchant | G06N 5/02 |
| 2017/0162189 A1 | 6/2017 | Liangliang et al. | |
| 2018/0052924 A1 | 2/2018 | Jagmohan et al. | |
| 2018/0165554 A1* | 6/2018 | Zhang | G06K 9/6256 |
| 2018/0357216 A1 | 12/2018 | Raimo et al. | |
| 2020/0142890 A1* | 5/2020 | Zhang | G06F 16/24578 |
| 2020/0184158 A1* | 6/2020 | Kuczmarski | G06N 20/00 |
| 2020/0233927 A1* | 7/2020 | Berger | G06F 40/216 |
| 2020/0257712 A1* | 8/2020 | Singh | G06F 16/93 |
| 2020/0364307 A1* | 11/2020 | Min | G06N 3/08 |
| 2020/0380952 A1* | 12/2020 | Zhang | G10L 13/047 |

OTHER PUBLICATIONS

List of IBM Patents or Applications Treated as Related, 2019.

Chedi Bechikh Ali et al., Bilingual Formal Concept Analysis for Cross-Language Information Retrieval, 2017 IEEE/ACS 14th International Conference on Computer Systems and Applications, 2017.

Eva Mujdricza-Maydt et al., High Precision Sentence Alignment by Bootstrapping from Woof Standard Annotations, The Prague Bulletin of Mathematical Linguistics, No. 99, Apr. 2013.

Aylin Caliskan et al., Semantics derived automatically from language corpora contain human-like biases, Aug. 25, 2016, http://randomwalker.info/publications/language-bias.pdf.

Alexis Conneau, Word Translation without Parallel Data, ICLR 2018, https://arxiv.org/pdf/1710.04087.pdf.

Tomas Mikolov et al., Efficient Estimation of Word Representations in Vector Space, International Conference on Learning Representations, Sep. 7, 2013.

Frederic Lardinois, Techcrunch.com, Google's AutoML lets you train custom machine learning models without having to code, downloaded Feb. 1, 2019.

Tomas Mikolov et al., Exploiting Similarities among Languages for Machine Translation, https://arxiv.org/pdf/1309.4168v1.pdf, Sep. 17, 2013.

Kia Dashtipour et al., Multilingual Sentiment Analysis: State of the Art and Independent Comparison of Techniques, Cogn Comput (2016) 8:757-771, DOI 10.1007/s12559-016-9415-7, Jun. 1, 2016.

Sebastian Ruder et al., A survey of Cross-lingual word embedding models,arXiv preprint arXiv: 1706.04902 Jun. 15, 2017, pp. 1-62. (Year: 2017).

Yftah Ziser et al., Deep Pivot-Based Modeling for Cross-language Cross-domain Transfer with Minimal Guidance, Proceedings of the 2018 Conference on Empirical Methods in Natural Language Processing, 2018, ACL pp. 238-249. (Year: 2018).

\* cited by examiner

METHOD AND SYSTEM FOR LANGUAGE AND DOMAIN ACCELERATION WITH EMBEDDING ALIGNMENT

BACKGROUND OF THE INVENTION

In today's globalized world, companies need to be able to understand and analyze what's being said out there, about them, their products, services, or their competitors, regardless of the domain and the language used. Many organizations have spent tremendous resources to develop cognitive applications and services for dealing with customers in different countries and different domains. For example, cognitive systems (such as the IBM Watson™ artificially intelligent computer system or and other natural language question answering systems) may use machine learning techniques to process input messages or statements to determine their meaning and to provide associated confidence scores based on knowledge acquired by the cognitive system. Typically, the use of such cognitive systems requires the training individual machine learning models in a specific language or in a specific domain. For example, a customer care tone analyzer model can be built to predict tones from English-language conversations in a "customer care" domain, but such model would not work effectively with other languages or domains. While translation techniques have been applied to translate data from an existing language to another language, human translation is labor-intensive and time-consuming, and machine translation can be costly and unreliable. There have also been efforts to customize pre-trained models for specific tasks, but this often requires domain expertise and extensive resources. As a result, attempts to scale existing applications to multiple human languages has traditionally proven to be difficult, mainly due to the language-dependent nature of preprocessing and feature engineering techniques employed in traditional approaches. It is also challenging to generalize these applications to various domains because of domain-specific linguistics and semantics.

SUMMARY

Broadly speaking, selected embodiments of the present disclosure provide an information handling system, method, computer program product, and apparatus for building natural language understanding models that are language and domain independent by assembling multiple embeddings in different languages and domains, by aligning the embeddings to be language and domain independent using parallel vocabulary to generate a transformation matrix, and by evaluating the aligned embeddings based on the association of concepts and attributes, thereby generating and storing cross-domain, multilingual embeddings for language enablement and domain customization. Given a set of input data embeddings from different language and domains, selected embodiments of a multi-lingual/domain embedding system will automatically combine the input data embeddings in multiple languages/domains together to form a language/domain independent artificial intelligence model that may be used for applications in new languages and/or domains, thereby scaling the efforts to enable services and applications in new languages and domains.

The foregoing is a summary that is provided to introduce a selection of concepts in a simplified form that are further described hereinbelow and thus contains, by necessity, simplifications, generalizations, and omissions of detail. Thus, persons skilled in the art will appreciate that the summary is illustrative only and is not intended to identify key factors or essential features of the claimed subject matter, nor is it intended to be used to limit the scope of the claimed subject matter. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the functionality and operation of a cognitive systems by efficiently providing for language and domain acceleration with embedding evaluation for improved generation of natural language understanding models.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
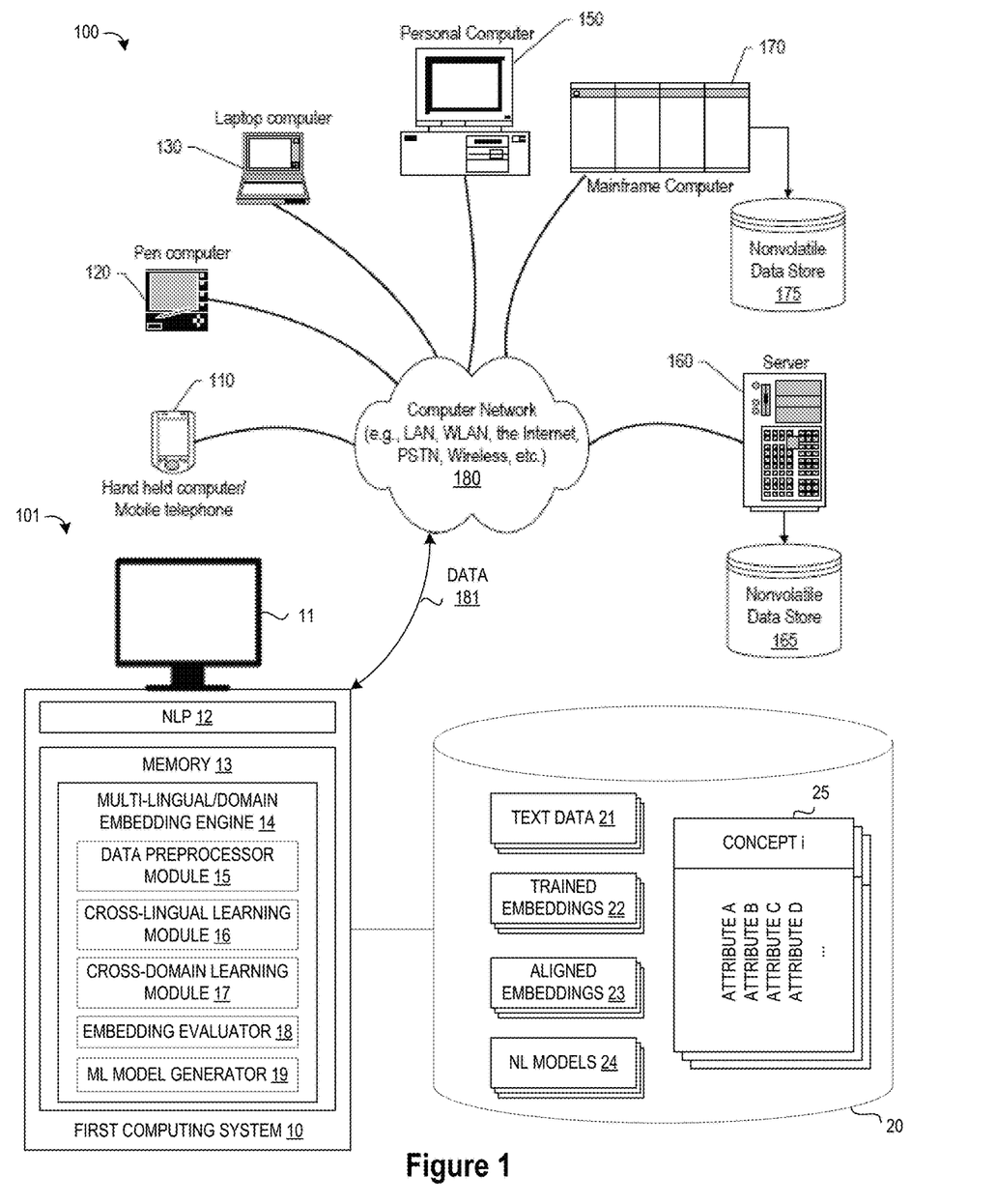
FIG. 1 depicts a network environment in which an information handling system uses a multi-lingual/domain embedding system to align and evaluate embeddings from multiple languages and domains in accordance with selected embodiments of the present disclosure.

FIG. 1 depicts a network environment 100 in which an information handling system uses a multi-lingual/domain embedding system to align and evaluate embeddings from multiple languages and domains in accordance with selected embodiments of the present disclosure. Types of information handling systems range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet, computer 120, laptop or notebook computer 130, personal computer system or workstation 150, server 160, and mainframe computer 170. Other types of information handling systems that are not individually shown in FIG. 1 are represented by information handling system 101. As shown, the various information handling systems can be networked together using computer network 180. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 1 includes separate nonvolatile data stores (more specifically, server 160 utilizes nonvolatile data store 165, mainframe computer 170 utilizes nonvolatile data store 175, and information handling system 101 is embodied with a first computing system 11 which utilizes nonvolatile data store 20).

As described more fully hereinbelow, the information handling system 101 may be specifically configured to implement a multi-lingual/domain embedding system 14. The configuring of the computing device may comprise the providing of application specific hardware, firmware, or the like to facilitate the performance of the operations and generation of the outputs described herein with regard to the illustrative embodiments. In addition or in the alternative, the configuring of the computing device may include storing software applications in one or more storage devices and loaded into memory of a computing device, such as the information handling system 101, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

To provide input data and/or embeddings, the information handling system 101 may receive data input 181 from the network 180, one or more knowledge bases or corpora 20 which store text data 21, trained embeddings 22, aligned embeddings 23, natural language models 24, concept/attribute data sets 25 or other sources of data input. In selected embodiments, the text data 21 stored in the knowledge base 20 may include structured, semi-structured, and/or unstructured content written in a plurality of different languages and/or domains. Similarly, the trained embeddings 22 stored in the knowledge base 20 may include embeddings written in multiple different languages and/or domains. Upon receiving the input data/embeddings, the first computing device is configured into a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that accelerates the generation of machine learning models that are language-independent and domain-independent.

In selected embodiments, the information handling system 101 may be implemented with a first computing device 10 that is connected to a display 11 and a memory or database storage 20. In the first computing system 10, a natural language processor (NLP) 12 executes program code instructions stored in memory 13 implementing a multi-lingual/domain embedding engine 14 to receive, evaluate and process input text data 21 and/or trained embeddings 22 in multiple different languages and domains for transformation into aligned embeddings 23 which are used to generate language-independent and domain-independent machine learning models 24.

To this end, the multi-lingual/domain embedding engine 14 includes a data preprocessor module 15 for generating and/or assembling trained embeddings 22, also known as distributed vector representations, which are stored in the memory/database storage 20. As disclosed herein, the data preprocessor module 15 uses any suitable technique to process the input text data 21 into multiple monolingual embeddings 22 that are trained in different languages and domains. As will be appreciated by those skilled in the art, a word "embedding" refers to a set of language modeling and feature learning techniques in natural language processing (NLP) where words or phrases from the vocabulary are mapped to vectors of real numbers. Ideally, an embedding places semantically similar inputs close together in the embedding space to capture the semantics of the inputs. Conceptually, it involves a mathematical embedding from a space with one dimension per word to a continuous vector space with a much lower dimension. Methods for generating embedding mappings include neural networks, dimensionality reduction on the word co-occurrence matrix, probabilistic models, explainable knowledge base method, explicit representation in terms of the context in which words appear, and the like. As disclosed herein, the trained embeddings 22 include monolingual embeddings in different languages.

The multi-lingual/domain embedding engine 14 also includes a cross-lingual learning module 16 for aligning monolingual embeddings from different languages 22 which are stored in the memory/database storage 20. As disclosed herein, the cross-lingual learning module 16 uses any suitable technique to process the trained monolingual embeddings 22 in different languages so that they are aligned in a shared space where words of high semantic similarity across languages are close to each other. The aligned embeddings are referred to as multilingual embeddings. As will be appreciated by those skilled in the art, cross-lingual learning may be implemented by constructing a parallel vocabulary from key or "anchor" words (e.g., frequent unigrams) in each monolingual embedding, and then using the parallel vocabulary as anchor points to transform a first or "source" embedding space into a second or "target" embedding space. As disclosed herein, the cross-lingual learning module 16 learns a transformation matrix for aligning different monolingual embeddings into multilingual embeddings 23 that are lingually-aligned in a shared space.

In addition, the multi-lingual/domain embedding engine 14 includes a cross-domain learning module 17 for aligning monolingual embeddings from different domains 22 which are stored in the memory/database storage 20. As disclosed herein, the cross-domain learning module 17 uses any suitable technique to process the trained monolingual embeddings 22 in different domains so that they are aligned in a shared space where words of high semantic similarity across different domains are close to each other. The domain-aligned embeddings are stored as cross-domain multilingual embeddings. As will be appreciated by those skilled in the art, cross-domain learning may be implemented by constructing a parallel vocabulary from key or "anchor" words (e.g., stopwords) in each monolingual embedding, and then using the parallel vocabulary as anchor points to transform a first or "source" embedding space into a second or "target" embedding space. As disclosed herein, the cross-lingual learning module 17 learns a transformation matrix for aligning multilingual embeddings from different domains into cross-domain multilingual embeddings 23.

To evaluate the quality of the cross-domain multilingual embeddings 23 generated by the cross-lingual learning module 16 and the cross-domain learning module 17, the multilingual/domain embedding engine 14 also includes an embedding evaluator module 18 for measuring the associations the model has between words or phrases to provide insights of the quality of the aligned embeddings 23 stored in the memory/database storage 20. As disclosed herein, the embedding evaluator module 18 uses any suitable technique to process the aligned embeddings 23, such as by using a plurality of concept and attribute sets 26 to evaluate the generated embeddings based on the degree to which an embedding associates sets of target concepts with sets of attribute words. As will be appreciated by those skilled in the art, embedding evaluation may be implemented by determining the association between two given words using a calculation of the cosine similarity between the embedding vectors for the words. Given two sets of target words and two sets of attribute words from two different languages, if the two monolingual embeddings are aligned perfectly, there should be no difference between the target words in terms of their relative similarity to the attribute words. In selected embodiments, the embedding evaluator module 18 may feed the evaluation results back to the cross-lingual learning module 16 and/or the cross-domain learning module 17 to further optimize the alignment process. Furthermore, if none of the aligned embeddings are of acceptable quality, the embedding evaluator module 18 may notify the data pre-processor module 15 to refine the training of the initial monolingual embeddings 22.

Finally, the multi-lingual/domain embedding engine 14 may include a machine learning model generator 19 for processing the cross-domain, multilingual embeddings 23 into one or more language-independent and domain-independent natural language models 24 stored in the memory/database storage 20. As disclosed herein, the machine learning model generator 19 uses any suitable training technique to generate the models 24 from the cross-domain multilingual embeddings 23. As will be appreciated by those skilled in the art, machine learning models may be trained with any of a number of machine learning products (e.g., IBM Watson Studio, IBM Watson Machine Learning for z/OS, IBM Watson Explorer, or the like) that enable developers to train high quality models specific to their needs.

Figure 2:
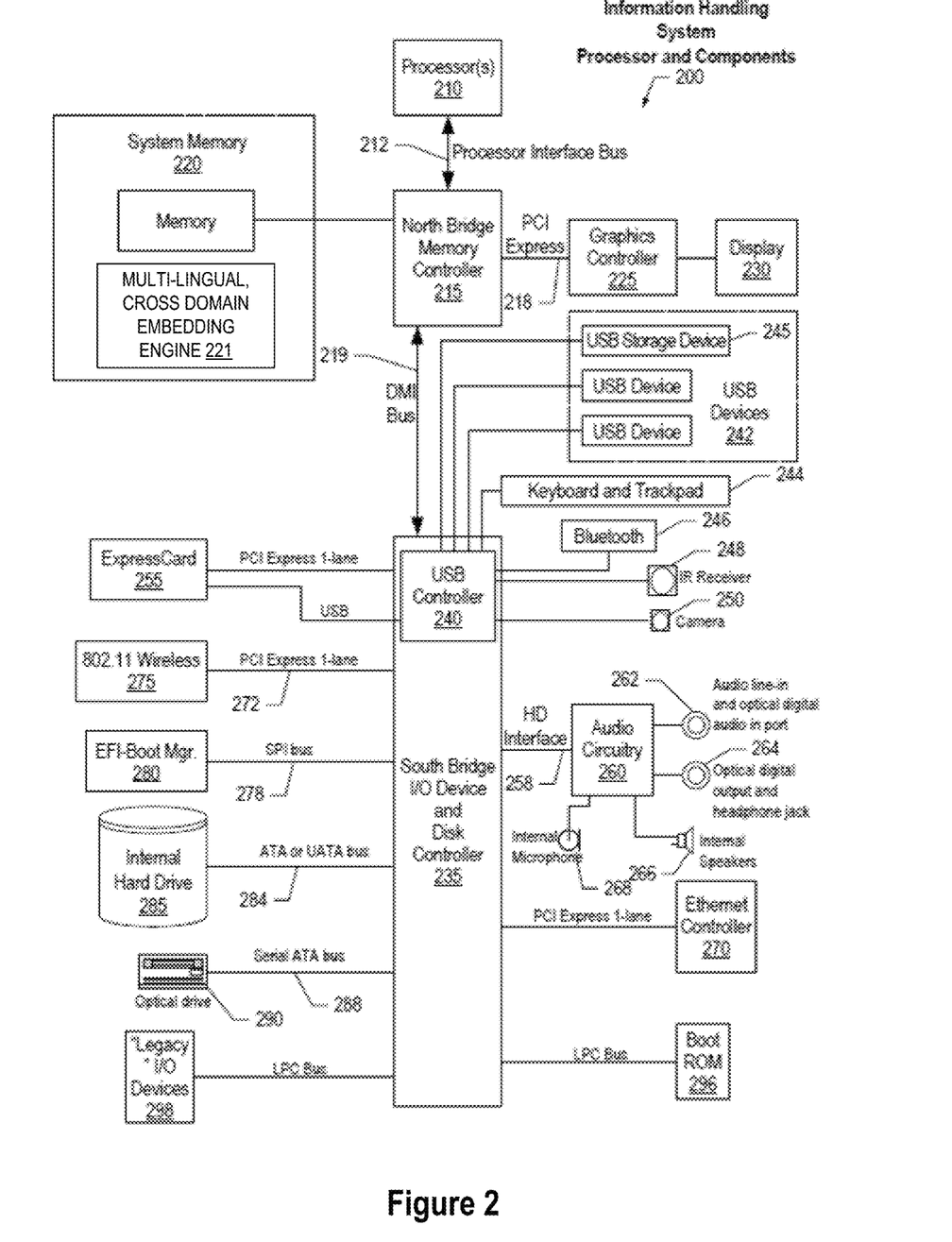
FIG. 2 is a block diagram of a processor and components of an information handling system such as those shown in FIG. 1.

To provide additional details for an improved understanding of selected embodiments of the present disclosure, reference is now made to FIG. 2 which depicts a block diagram of an information handling system 200 which includes a processor and common components that are capable of performing the computing operations described herein. As illustrated, the information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including a multi-lingual, cross domain embedding engine 221 which may be invoked (1) to process monolingual embeddings in different languages and domains for alignment in a shared embedding space by transforming embeddings with a constructed parallel vocabulary of different languages/domains to seamlessly integrate two levels of constraints (language and domain) in the shared embedding space, and (2) to evaluate the cross-lingual alignment and/or cross-domain alignment of the embeddings across different languages and different domains. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to non-volatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
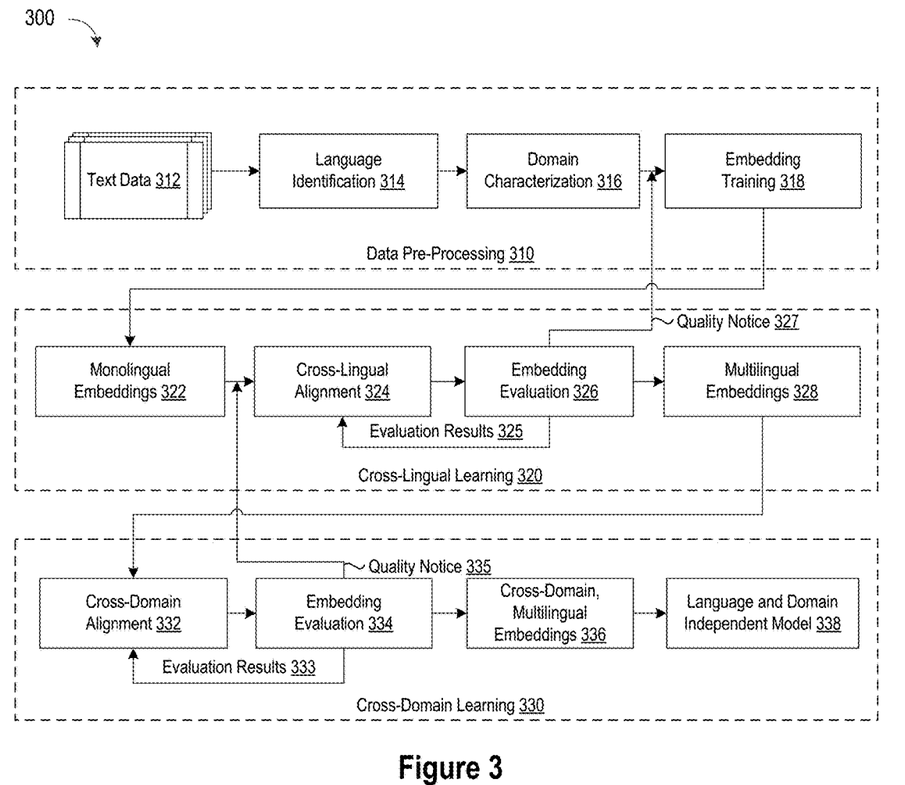
FIG. 3 is a diagrammatic overview of the system infrastructure for building natural language understanding models that are independent of languages and domains in accordance with selected embodiments of the present disclosure.

To provide additional details for an improved understanding of selected embodiments of the present disclosure, reference is now made to FIG. 3 which depicts a diagrammatic overview of the system infrastructure 300 for processing input text data 312 to build natural language understanding models 338 that are independent of languages and domains. In selected embodiments, the input text data 312 is the text data to be used for a specific machine learning task. For example, sentiment analysis is a primary natural language understanding task in many companies to understand customers' feedback on their products. Product reviews and social media comments can be collected as text data 312 to train a sentiment model 338 that predicts people's sentiment from their digital footprints. However, the output of the system 300 is any generalized model for any natural language understanding task that uses embeddings as features.

As depicted, the system infrastructure 300 may include three subsystems: (1) the data pre-processing subsystem 310, (2) the cross-lingual learning subsystem 320, and (3) the cross-domain learning subsystem 330. The data pre-processing subsystem 310 trains monolingual word embeddings in different languages and domains. The cross-lingual learning subsystem 320 focuses on model training with data from multiple languages and serving applications in multiple languages. The cross-domain learning subsystem 330 provides automatic customization of applications across multiple domains. While shown as separate subsystems, the cross-lingual learning subsystem 320 and cross-domain learning subsystem 330 can be combined together as a multi-level learning environment or may also be implemented in reverse order.

In the data pre-processing subsystem or phase 310, the input text data 312 may be constantly analyzed by the language identification module/process 314 and the domain characterization module/process 316 so that embeddings 318 can be trained for each language and each domain. For example, the language identification module/process 314 may extract and analyze words from the text data 312 for comparison to dictionaries from different languages in order to identify the language for each text data file 312. In addition, the domain characterization module/process 316 may evaluate the words in the text data 312 against word frequency distributions for different domains to identify the domain for each text data file 312. In addition, the embedding training module/process 318 may use any suitable vectorization mechanism to process the text data 312 to generate vectors to represent words to provide a distributed representation of the words in a language. Such mechanisms include "brute force" learning by various types of Neural Networks (NNs), learning by log-linear classifiers, or various matrix formulations. Lately, word2vec, that uses classifiers, has gained prominence as a machine learning technique which is used in the natural language processing and machine translation domains to produce vectors which capture syntactic as well semantic properties of words. Matrix based techniques that first extract a matrix from the text and then optimize a function over the matrix have recently achieved similar functionality to that of word2vec in producing vectors.

In the learning subsystems or phases 320, 330, the embeddings 318 are aligned and evaluated across different languages and different domains using a cross-lingual alignment module/process 324 and cross-domain alignment module/process 332, thereby generating cross-domain, multilingual embeddings 336. In addition, each of the learning phases 320, 330 may include embedding evaluation modules/processes 326, 334 that are used to evaluate embeddings at different levels, to feed the evaluation results into embedding training, embedding alignment and model prediction, and to identify aligned embeddings of good quality that will be used to build language-independent and domain-independent models for a specific natural language understanding task.

In selected embodiments, the cross-lingual learning subsystem or phase 320 is applied first to multiple monolingual embeddings 322 in different languages to generate multilingual embeddings 328 in a shared space where words of high semantic similarity across languages are close to each other. While any suitable lingual alignment technique may be used, selected embodiments of the present disclosure use a transformation matrix to exploit the fact that continuous embedding spaces exhibit similar structures across languages. In particular, by learning a linear mapping or transformation from a source embedding space to a target embedding space, a transformation matrix can be generated for use in aligning the source and target embeddings. For example, the cross-lingual alignment module/process 324 may be connected and configured to receive the monolingual embeddings 322 trained in a plurality of languages, and to align the embeddings 322 in a shared space where words of high semantic similarity across languages are close to each other. The aligned embeddings are referred to as multilingual embeddings 328. To align two monolingual embeddings 322, the cross-lingual alignment module/process 324 may be configured to construct a parallel vocabulary of representative words which are used as anchor points to transform the source embedding space to the target embedding space. As disclosed herein, a systematic approach for constructing a parallel vocabulary may retrieve the data that is used to train the monolingual embeddings 322. From the retrieved training data, unigrams are extracted and then sorted by their frequency in a descending order in both the source and the target languages. Subsequently, machine translation techniques are used to translate the words from the source language to the target language, and also from the target language to the source language. The translation pairs that exist in both directions are kept as the parallel vocabulary. Using the parallel vocabulary of the most frequent 5000 unique words in the source languages as anchor points, a linear mapping between the source embedding space and the target embedding space is obtained by learning a transformation matrix. The transformation matrix is then applied to all word vectors from the source embedding space to align them with the word vectors from the target embedding space, thereby generating the multilingual embeddings 328. This approach can be easily extended to aligning more than two embeddings by specifying one as target and the others as source.

To evaluate the alignment quality of the multilingual embeddings 328 generated by the cross-lingual alignment module/process 324, an embedding evaluation module/process 326 may be inserted in the cross-lingual learning subsystem/phase 320 to measure the associations the model has between words or phrases to provide insights of the quality of the embedding. In operation, the embedding evaluation module/process 326 evaluates the generated embeddings 328 based on the degree to which an embedding associates sets of target concepts with sets of attribute words. The association between two given words may be computed as the cosine similarity between the embedding vectors for the words. Given two sets of target words and two sets of attribute words from two different languages, if the two monolingual embeddings are aligned perfectly, there should be no difference between the target words in terms of their relative similarity to the attribute words. The evaluation results 325 generated by the embedding evaluation module/process 326 can be fed back into the cross-lingual alignment module/process 324 to further optimize the alignment process. In addition or in the alternative, if the embedding evaluation module/process 326 determines that none of the aligned embeddings meeting a minimum threshold requirement for acceptable quality, the embedding evaluation module/process 326 may send a quality notification message 327 to notify the embedding training module/process 318 to refine the training of the initial monolingual embeddings 322.

In selected embodiments, the cross-domain learning subsystem/phase 330 is applied to the multilingual embeddings 328 to generate general-purpose embeddings 336 that are suitable for natural language understanding applications across multiple domains. For example, consider the example of a "news media" domain and a separate "customer care" domain, the cross-domain learning subsystem/phase 330 can be applied to train a named-entity recognition model on news articles text corpus and use it to identify entities from customer care conversations. In accordance with the present disclosure, any suitable domain alignment technique may be used. For example, the cross-domain alignment module/process 332 may be connected and configured to receive and align the multilingual embeddings 328 in a cross-domain, multilingual embeddings space 336. One approach is for the cross-domain alignment module/process 332 to continuously train the source embedding space towards the target domain, such as by using human annotated words with crowdsourcing. However, this approach requires a large amount of text data from the target domain. Another approach that requires no additional text data is for the cross-domain alignment module/process 332 to use stopwords that appear in both domains as a parallel vocabulary to learn a linear mapping from a source embedding space to a target embedding space that can be applied as a transformation matrix for use in aligning the source and target domains. As will be appreciated, stopwords are understood to refer to the most common words in a language that are not domain specific. While there is no single universal list of stop words used by all natural language processing tools, any group of words can be chosen as the stop words for a given purpose. Using the parallel vocabulary of the shared stopwords in both domains as anchor points, the cross-domain alignment module/process 332 may be configured to obtain a linear mapping between the source embedding space and the target embedding space by learning a transformation matrix, and then applying the transformation matrix to all word vectors from the source embedding space to align them with the word vectors from the target embedding space. For each word that has different vector representations in the aligned embeddings, the cross-domain alignment module/process 332 may compute an average vector as the resulting vector representation. In selected embodiments, the cross-domain alignment module/process 332 may combine these two embodiments together to generate an aggregated embedding space from the two corresponding embedding spaces.

To evaluate the alignment quality of the cross-domain, multilingual embeddings 336 generated by the cross-domain alignment module/process 332, an embedding evaluation module/process 334 may be inserted in the cross-domain learning subsystem/phase 330 to measure the degree to which an embedding associates sets of target concepts with sets of attribute words. In operation, the embedding evaluation module/process 334 evaluates the general-purpose embeddings 336 based on the degree to which an embedding associates sets of target concepts with sets of attribute words. The association between two given words may be computed as the cosine similarity between the embedding vectors for the words. Given two sets of target words and two sets of attribute words from two different domains, if the two monolingual embeddings are aligned perfectly, there should be no difference between the target words in terms of their relative similarity to the attribute words. The evaluation results 333 generated by the embedding evaluation module/process 334 can be fed back into the cross-domain alignment module/process 332 to further optimize the domain alignment process, such as by optimizing the weights to aggregate the embeddings from the two aforementioned embodiments of cross-domain alignment 332. In addition or in the alternative, if the embedding evaluation module/process 334 determines that none of the aligned embeddings meeting a minimum threshold requirement for acceptable quality, the embedding evaluation module/process 334 may send a quality notification message 335 to notify the cross-lingual alignment module/process 324 to refine the multilingual embeddings in the cross-lingual learning subsystem/phase 320.

The cross-domain, multilingual embeddings 336 produced by the cross-domain learning subsystem/phase 330 are general-purpose embeddings that are suitable for natural language understanding applications across multiple languages and domains. For example, the embeddings 336 may be applied to train a machine learning model with a machine learning product, such as IBM Watson Studio, IBM Watson Machine Learning for z/OS, IBM Watson Explorer, or the like.

As seen from the foregoing, cross-lingual learning and cross-domain learning subsystems/phases 320, 330 are combined together as a multi-level learning environment to create high-quality cross-domain, multilingual embeddings. While the cross-lingual learning subsystem/phase 320 is shown as being applied first to the monolingual embeddings 322, it will be appreciated that the order may be reversed or combined as desired. In whatever form or sequence is used, one or more embedding evaluation modules/processes may be inserted to evaluate the quality of alignment by using vector cosine similarity measures to determine the degree to which an embedding associates sets of target concepts with sets of attribute words.

Figure 4:
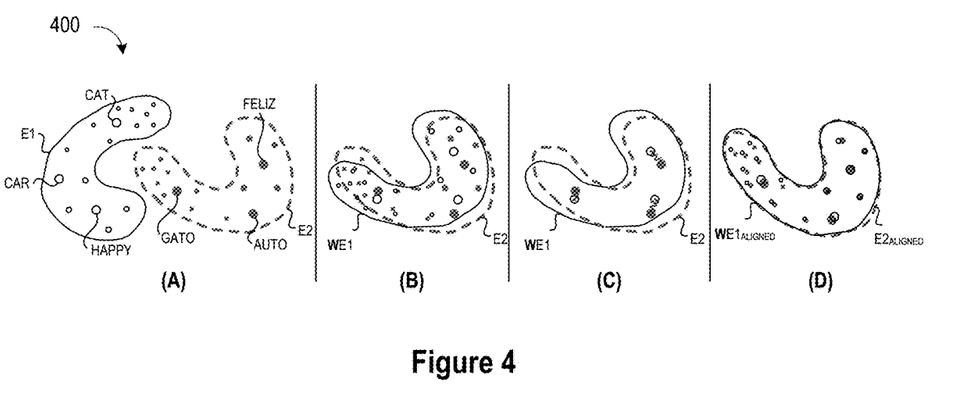
FIG. 4 is a simplified illustration of a sequence for aligning embeddings from different languages and domains into a shared embedding space in accordance with selected embodiments of the present disclosure.

To provide additional details for an improved understanding of selected embodiments of the present disclosure, reference is now made to FIG. 4 which depicts a simplified illustration 400 of a sequence for aligning embeddings E1, E2 from different languages or domains into a shared embedding space. In FIG. 4A, there is shown two non-aligned sets of embeddings E1, E2 that are trained independently on monolingual data, including a first embedding E1 that includes English words and a second embedding E2 that includes Spanish words to be aligned/translated. Each dot represents a word in that space, and the size of the dot is proportional to the frequency of the words in the training corpus of that language. In FIG. 4B, the first embedding E1 is rotated into rough alignment with the second embedding E2, such as by using adversarial learning to learn a rotation matrix W for roughly aligning the two distributions. In FIG. 4C, the mapping rotation matrix W may be further refined using a geometric transformation, such as a Procrustes transformation, that involves only translation, rotation, uniform scaling, or a combination of these transformations whereby frequent words aligned by the previous step are used as anchor points to minimize an energy function that corresponds to a spring system between anchor points. The refined mapping rotation matrix W' is then applied to the first embedding E1 to map all words in the dictionary. In FIG. 4D, the first embedding E1 is translated by using the mapping rotation matrix W' and a distance metric that expands the space where there is high density of points (like the area around the word "cat"), so that "hubs" (like the word "cat") become less close to other word vectors than they would otherwise (compared to the same region in FIG. 4A). As seen from the foregoing, the embedding alignment sequence shown in FIGS. 4A-D can be used to build a bilingual dictionary between two languages without using any parallel corpora by aligning monolingual word embedding spaces in an unsupervised way. However, it will be appreciated that there are other alignment methods for learning cross-lingual word embeddings which use existing bilingual dictionaries or parallel corpora and/or which use supervised machine translation methods.

Figure 5:
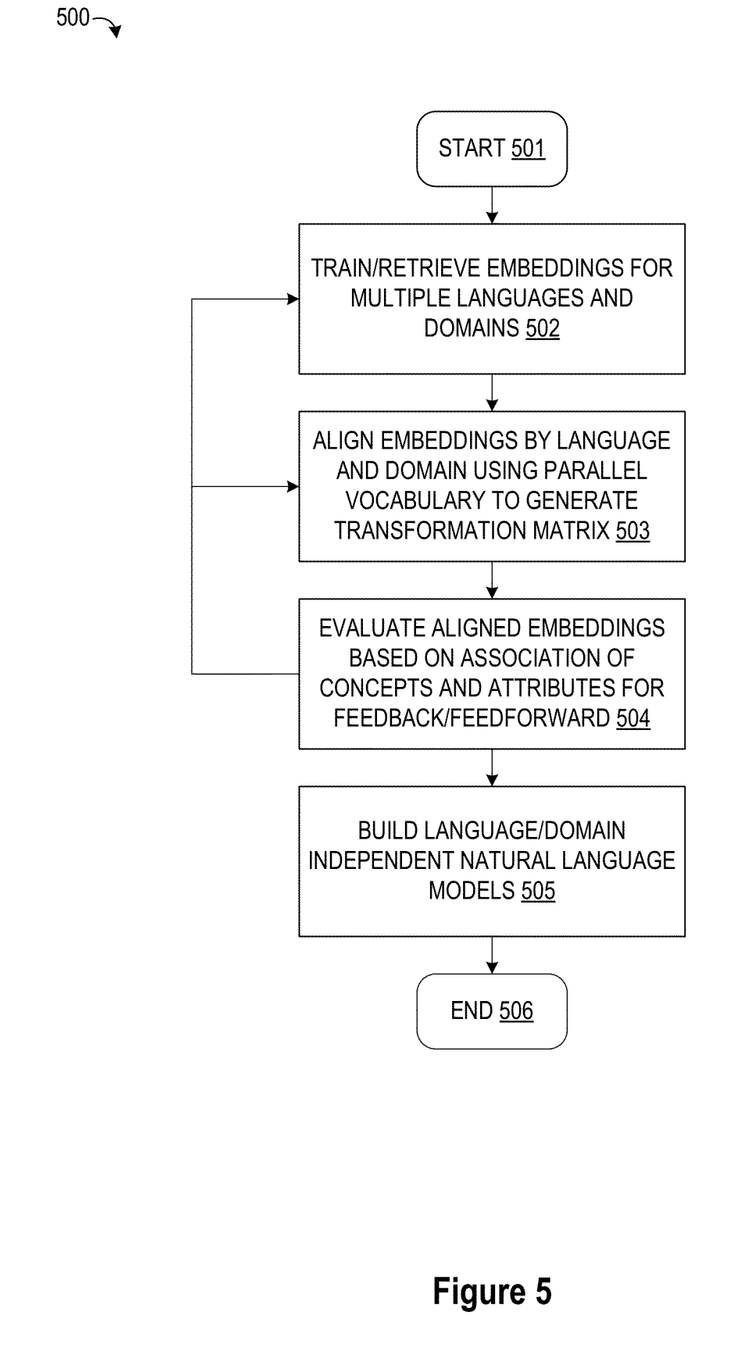
FIG. 5 illustrates a simplified flow chart showing the logic for aligning embeddings by language and domain and evaluating the aligned embeddings in accordance selected embodiments of the present disclosure.

To provide additional details for an improved understanding of selected embodiments of the present disclosure, reference is now made to FIG. 5 which depicts a simplified flow chart 500 showing the logic for aligning embeddings by language and domain and evaluating the aligned embeddings. The processing shown in FIG. 5 may be performed in whole or in part by a cognitive system, such as the information handing system 101 or other natural language question answering system, which uses programmable natural language processing (NLP) software, hardware and/or firmware to pre-process input text data for generating monolingual embeddings, to perform cross-lingual learning for generating multilingual embeddings, to perform cross-domain learning for generating cross-domain multilingual embeddings, and to use the cross-domain multilingual embeddings for training a language and domain independent model. The disclosed methods provide a compact, fast, and accurate mechanism for training a machine learning model by generating embeddings that are aligned and evaluated across different languages and domains to build language-independent and domain-independent models for a specific natural language understanding task.

As a preliminary step, the multi-language, multi-domain embedding process commences at step 501 whereupon the following steps are performed:

Step 502: Embeddings from multiple languages and domains are trained and/or retrieved in a data pre-processing stage. In selected embodiments, the data pre-processing stage commences when input text data is assembled from different countries or domains. For example, customer feedback relating to different domains may be collected from customers in different countries speaking different languages. Alternatively, a plurality of artificial intelligence services in different domains—such as conversation offerings (e.g., Watson Conversation Service or Virtual Agent), discovery offerings (e.g., Watson discovery service, natural language understanding, knowledge studio), or foundation offerings (e.g., Watson speech-to-text service, text-to-speech service, or natural language classifier)—may be assembled in a plurality of different languages. The data pre-processing step 502 may continuously receive and analyze input text data using language identification and domain characterization services. In addition, the data pre-processing step 502 may use any vectorization techniques—such as "brute force" learning by various types of Neural Networks (NNs), learning by log-linear classifiers, matrix formulations, word2vec, or the like—to process the text data into vector representations of the words to provide a distributed representation of the words in a language.

Step 503: Align embeddings by language and domain using parallel vocabularies to generate a transformation matrix for embedding alignment. In selected embodiments, a natural language processor is applied to process monolingual embeddings from different languages and domains into embedding alignment, such as by constructing a parallel vocabulary of different languages and/or domains that is used to perform a linear mapping between a source embedding space and the target embedding space, thereby learning a transformation matrix that is applied to all word vectors from the source embedding space to align them with the word vectors from the target embedding space.

For example, the embedding alignment step 503 may apply cross-lingual learning to monolingual embeddings from different languages by constructing a parallel vocabulary with an NLP process that performs machine learning translations to frequent unigrams extracted from the monolingual embeddings to translate words from one language to another, and then stores the translation pairs in both directions as the parallel vocabulary. Using a threshold number of unique words (e.g., 5000) from the parallel vocabulary as anchor points, a transformation matrix between the source and target embedding spaces may be computed from a linear mapping between the source and target embedding spaces, and then applied to all word vectors from the source embedding space to align them with word vectors in the target embedding space, thereby aligning the source and target embeddings in a shared language embedding space.

Similarly, the embedding alignment step 503 may apply cross-domain learning to multi-lingual embeddings from different domains by constructing a parallel vocabulary with an NLP process that identifies stopwords appearing in both domains as the parallel vocabulary. Using the parallel vocabulary of shared stopwords in both domains as anchor points, a transformation matrix between the source and target embedding spaces may be computed from a linear mapping between the source and target embedding spaces, and then applied to all word vectors from the source embedding space to align them with word vectors in the target embedding space, thereby aligning the source and target embeddings in a shared domain embedding space.

Step 504: Evaluate aligned embeddings based on association of concepts and attributes for feedback/feedforward. In selected embodiments, a natural language processor is applied to evaluate the alignment quality of the embeddings on the basis of language and/or domain alignment. This evaluation may be performed by measuring the associations the model has between sets of target concepts and associated sets of attribute words or phrases for those concepts. To provide an example illustration of the embedding evaluation process at step 504, a first target concept set includes a word in both embeddings (e.g., the word "cat" (in English) and "gato" (in Spanish). In addition, an associated set of attribute words includes one or more words (e.g., "love", "peace", "small" (English)/"amor", "paz", "pequeña" (Italian). Based on the aligned English-to-Spanish embeddings, the cosine similarity between "cat" and each word in ["love", "peace", "small"] can be computed and averaged as a first vector s1, while the cosine similarity between "cat" and each word in ["amor", "paz", "pequeña"] can also be computed and averaged as a second vector s2. The closer that the second vector s2 is to the first vector s1, the better the alignment is. If the two embeddings are aligned perfectly, then s1=s2. In selected embodiments, the embedding evaluation step 504 may compute the absolute difference of s1 and s2 for each target concept word, and then aggregate the differences for multiple target concept words for an overall assessment of the embedding alignment.

As shown with the feedback lines to the data pre-processing step 502 and embedding alignment step 503, the embedding evaluation step 504 may propagate evaluation results as feedback to different levels in the process. For example, the embedding evaluation step 504 may feed evaluation back to the embedding alignment step 503 to further optimize the alignment process. In addition or in the alternative, if the embedding evaluation step 504 determines that none of the aligned embeddings meeting a minimum threshold requirement for acceptable quality, the embedding evaluation step 504 may notify the data pre-processing step 502 to refine the training of the initial monolingual embeddings. Similarly, the embedding evaluation step 504 may propagate evaluation results of the quality of domain alignment as feedback or notifications to different levels in the process 500.

Step 505: Build a language-independent and domain-independent natural language model. In selected embodiments, the aligned embeddings produced by the embeddings step 503 and evaluation step 504 are general-purpose embeddings that are language and domain independent and that are suitable for building natural language understanding applications across multiple languages and domains. For example, the model building step 505 may train a language and domain independent NLP model on training data using word embeddings of the trained multilingual embedding as features, thereby enabling the trained NLP model to be applied for data from the source languages/domains used to generate the embedding and/or from a new language and/or domain. As will be appreciated, the process flow steps 502-505 may be repeated as needed to align embeddings of different languages/domains using both continuous embedding training and parallel-vocabulary-based linear transformation, and to train the natural language models in different languages and/or domains until the process stops (step 506).

As disclosed herein, the ability to align embeddings across languages and domains results allows generalized embeddings to be used to train natural language understanding models with data in multiple languages and in multiple domains. The resulting language and domain independent models can be then used for applications in new languages and in new domains, thereby providing the ability to solve the "cold start" problem where no initial model is available for a new language or a new domain. Thus, instead of expending tremendous resources to develop cognitive applications and services for dealing with customers in different countries and different domains, the disclosed embedding alignment system is able to reuse existing annotated data in different languages and domains to deliver services for new models in languages and domains.

Figure 6:
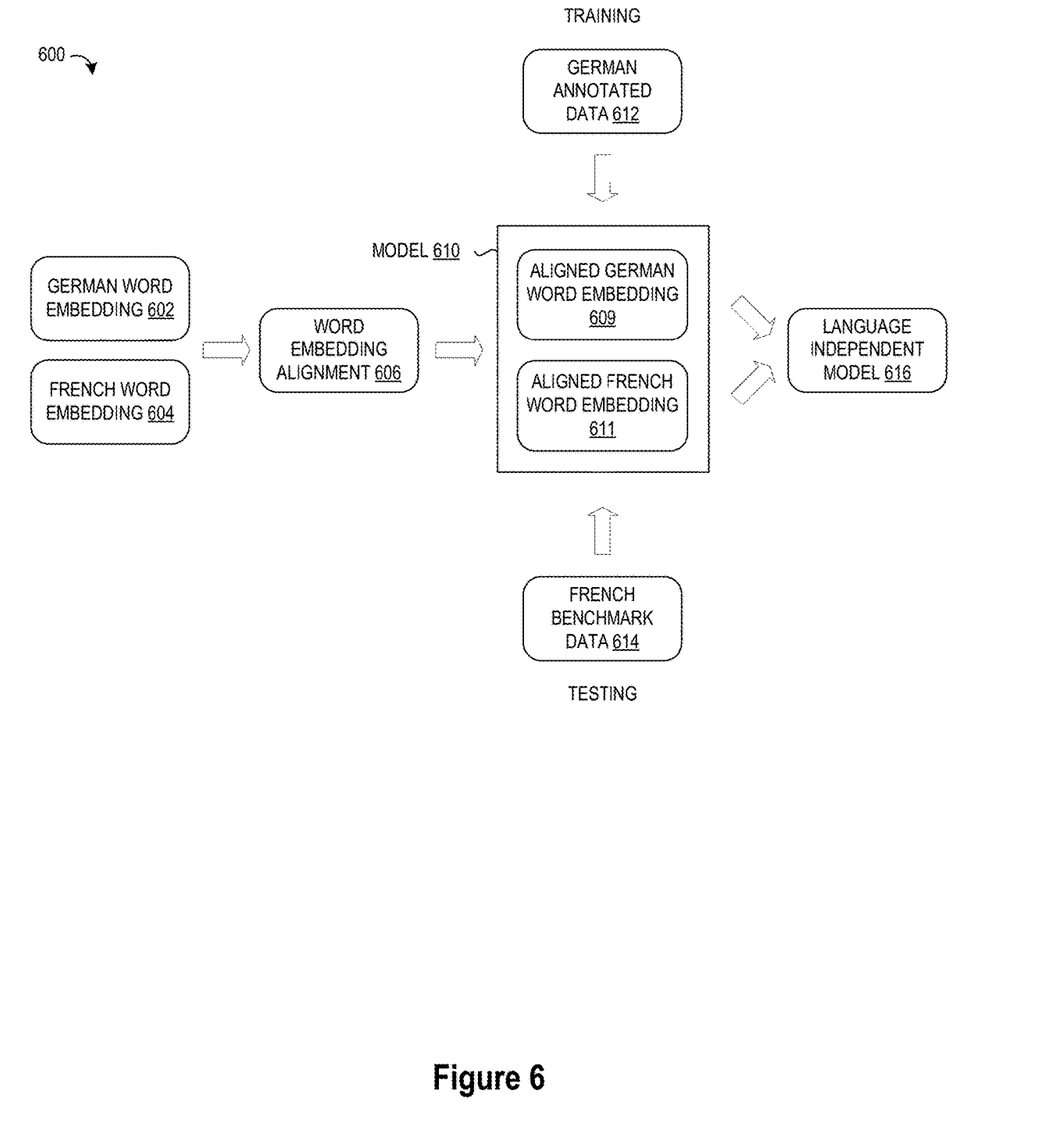
FIG. 6 is a block diagram illustration of an example system for aligning multiple word embeddings to generate a language-independent model in accordance with selected embodiments of the present disclosure.

To provide additional details of selected embodiments of the present disclosure, reference is now made to FIG. 6 which is a block diagram illustration of an example embedding system 600 for aligning multilingual word embeddings 602, 604 into a language-independent model 616 that can be used for a new language or domain. Though described with reference to an example sequence for implementing cross-lingual alignment, it will be appreciated that the same approach may be used for implementing cross-domain alignment. As depicted, the embedding system 600 receives inputs multiple word embeddings 602, 604 that are separately trained in two languages (e.g., a German word embedding and French word embedding) and/or separate domains. For example, the first word embedding 602 may denote a specific domain in a specific language, while the second word embedding 604 may denote another domain in a different language.

The input embeddings 602, 604 are then aligned through the word embedding alignment process 606 to generate output embeddings 609, 611 that are aligned in a shared vector space. For example, by combining the first and second word embeddings 602, 604 with an embedding in a third language (e.g., Italian), the aligned German word embedding 609 and French word embedding 611 are formed in a shared space to form the language (and domain) independent model 610.

By supplying training and testing data to the model 610, a language/domain independent model 616 can be generated. For example, German annotated data 612 can be used to train the aligned German word embedding 608 while French benchmark data 614 is used to test the aligned French word embedding 611, thereby generating a language independent model 616. More generally, the model 610 can be trained to generate an independent output model 616 using any combination of input word embeddings X, Y and Z, including (1) X only, (2) Y only, (3) Z only, (4) X and Y, (5) X and Z, (6) Y and Z, (7) X, Y and Z. With the multilingual, cross-domain embeddings, the model can make predictions in X, Y and Z. This is particularly useful when only part of the data is available (i.e., the first six combination cases), thereby providing a solution to the cold-start problem where no initial model is available for a new language or a new domain. After embedding alignment across languages and then across domains, the generalized embeddings can be used to train natural language understanding models with data in multiple languages and in multiple domains, which can be then used for applications in new languages and in new domains.

By now, it will be appreciated that there is disclosed herein a system, method, apparatus, and computer program product for aligning embeddings of multiple languages and domains into a shared embedding space at an information handling system having a processor and a memory. As disclosed, the system, method, apparatus, and computer program obtains or receives a plurality of monolingual embeddings trained in a plurality of languages and domains using a data pre-processing process. In selected embodiments, the monolingual embeddings are received by receiving and processing a plurality of input text data files to identify a language and a domain for each of the plurality of input text data files, and to thereby training the plurality of monolingual embeddings for each language and each domain identified from the plurality of input text data files. In addition, the system, method, apparatus, and computer program transform the plurality of monolingual embeddings into a plurality of multilingual embeddings in a first shared embedding space with a cross-lingual learning process which uses a linear mapping or transformation based on a first parallel vocabulary constructed between multiple languages. In selected embodiments, the monolingual embeddings are transformed by generating or constructing the first parallel vocabulary from the monolingual embeddings; computing a linear transformation or mapping using the first parallel vocabulary as anchor points to generate a transformation matrix between each of the monolingual embeddings and the first shared embedding space; and applying the transformation matrix to each of the monolingual embeddings to generate the plurality of multilingual embeddings in the first shared embedding space. In selected embodiments, the first parallel vocabulary is generated by extracting a plurality of unigrams from the monolingual embeddings; sorting the plurality of unigrams in descending order of frequency of appearance in the monolingual embeddings; applying a machine translation process to translate words in the plurality of unigrams from a source language to a target language and from the target language to the source language; and storing translation pairs that exist in both directions between the source language and the target language as the first parallel vocabulary. In addition, the system, method, apparatus, and computer program transform the plurality of multilingual embeddings into a plurality of cross-domain, multilingual embeddings in a second shared embedding space with a cross-domain learning process which uses a linear transformation based on a second parallel vocabulary constructed between multiple domains, thereby aligning multiple embeddings of different languages and domains using both continuous embedding training and parallel vocabulary-based linear transformation. In selected embodiments, the multilingual embeddings are transformed by generating the second parallel vocabulary from the multilingual embeddings; computing a linear mapping using the second parallel vocabulary as anchor points to generate a transformation matrix between each of the multilingual embeddings and the second shared embedding space; and applying the transformation matrix to each of the multilingual embeddings to generate the plurality of cross-domain, multilingual embeddings in the second shared embedding space. In selected embodiments, the second parallel vocabulary is generated by identifying a plurality of stopwords in the plurality of multilingual embeddings that are not domain specific; and storing, by the information handling system, the stopwords that exist in both a source domain and a target domain as the second parallel vocabulary. In addition, the system, method, apparatus, and computer program evaluate the plurality of multilingual embeddings to measure a degree to which the plurality of multilingual embeddings associates a set of target concepts with a set of attribute words, and then generates an evaluation result for feedback and optimization of the data pre-processing process and/or the cross-lingual learning process. In selected embodiments, the system, method, apparatus, and computer program may also evaluate the plurality of cross-domain, multilingual embeddings to measure a degree to which the plurality of cross-domain, multilingual embeddings associates a set of target concepts with a set of attribute words; and then generate an evaluation result for feedback and optimization of the cross-lingual learning process and/or the cross-domain learning process. Finally, the system, method, apparatus, and computer program train a natural language model using the plurality of cross-domain, multilingual embeddings as features to build a natural language model that is substantially independent of languages and domains. In selected embodiments, the natural language model is a sentiment model that is trained using monolingual embeddings trained in one or more first languages to assess a sentiment contained in monolingual embeddings trained in one or more second, different languages.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of aligning embeddings of multiple languages and domains into a shared embedding space, comprising:
  obtaining, by an information handling system comprising a processor and a memory, a plurality of monolingual embeddings trained in a plurality of languages and domains using a data pre-processing process;
  constructing, by the information handling system, a first parallel vocabulary from the plurality of monolingual embeddings;
  extracting, by the information handling system, a plurality of unigrams from the plurality of monolingual embeddings;
  sorting, by the information handling system, the plurality of unigrams in descending order of frequency of appearance in the plurality of monolingual embeddings;
  applying, by the information handling system, a machine translation process to translate words in the plurality of unigrams from a source language to a target language and from the target language to the source language;
  storing, by the information handling system, translation pairs that exist in both directions between the source language and the target language as the first parallel vocabulary;
  computing, by the information handling system, a linear transformation using the parallel vocabulary as anchor points to generate a transformation matrix between each of the plurality of monolingual embeddings and the first shared embedding space;

applying, by the information handling system, the transformation matrix to each of the plurality of monolingual embeddings to generate the plurality of multilingual embeddings in the first shared embedding space; and transforming, by the information handling system, the plurality of multilingual embeddings into a plurality of cross-domain, multilingual embeddings in a second shared embedding space with a cross-domain learning process which uses a linear transformation based on a second parallel vocabulary constructed between multiple domains, thereby aligning multiple embeddings of different languages and domains using both continuous embedding training and parallel vocabulary-based linear transformation.

2. The method of claim 1, where obtaining the plurality of monolingual embeddings comprises:

receiving, by the information handling system, a plurality of input text data files;

identifying, by the information handling system, a language for each of the plurality of input text data files;

identifying, by the information handling system, a domain for each of the plurality of input text data files; and training, by the information handling system, the plurality of monolingual embeddings for each language and each domain identified from the plurality of input text data files.

3. The method of claim 1, where transforming the plurality of multilingual embeddings into the plurality of cross-domain, multilingual embeddings comprises:

constructing, by the information handling system, the second parallel vocabulary from the plurality of multilingual embeddings;

computing, by the information handling system, a linear transformation using the second parallel vocabulary as anchor points to generate a transformation matrix between each of the plurality of multilingual embeddings and the second shared embedding space; and applying, by the information handling system, the transformation matrix to each of the plurality of multilingual embeddings to generate the plurality of cross-domain, multilingual embeddings in the second shared embedding space.

4. The method of claim 3, where constructing the second parallel vocabulary comprises:

identifying, by the information handling system, a plurality of stopwords in the plurality of multilingual embeddings that are not domain specific; and storing, by the information handling system, the stopwords that exist in both a source domain and a target domain as the second parallel vocabulary.

5. The method of claim 1, further comprising:

evaluating, by the information handling system, the plurality of multilingual embeddings to measure a degree to which the plurality of multilingual embeddings associates a set of target concepts with a set of attribute words; and generating, by the information handling system, an evaluation result for feedback and optimization of the data pre-processing process and/or the cross-lingual learning process.

6. The method of claim 1, further comprising:

evaluating, by the information handling system, the plurality of cross-domain, multilingual embeddings to measure a degree to which the plurality of cross-domain, multilingual embeddings associates a set of target concepts with a set of attribute words; and generating, by the information handling system, an evaluation result for feedback and optimization of the cross-lingual learning process and/or the cross-domain learning process.

7. The method of claim 1, further comprising training, by the information handling system, a natural language model using the plurality of cross-domain, multilingual embeddings as features to build a natural language model that is substantially independent of languages and domains.

8. An information handling system comprising:

one or more processors;

a memory coupled to at least one of the processors;

a set of instructions stored in the memory and executed by at least one of the processors to align embeddings of multiple languages and domains into a shared embedding space, wherein the set of instructions are executable to perform actions of:

receiving, by an information handling system comprising a processor and a memory, a plurality of input text data files;

identifying, by the information handling system, a language for each of the plurality of input text data files;

identifying, by the information handling system, a domain for each of the plurality of input text data files;

training, by the information handling system, a plurality of monolingual embeddings for each language and each domain identified from the plurality of input text data files;

extracting, by the information handling system, a plurality of unigrams from the plurality of monolingual embeddings;

sorting, by the information handling system, the plurality of unigrams in descending order of frequency of appearance in the plurality of monolingual embeddings;

applying, by the information handling system, a machine translation process to translate words in the plurality of unigrams from a source language to a target language and from the target language to the source language;

storing, by the information handling system, translation pairs that exist in both directions between the source language and the target language as a first parallel vocabulary;

computing, by the information handling system, a linear transformation using the first parallel vocabulary as anchor points to generate a transformation matrix between each of the plurality of monolingual embeddings and the first shared embedding space;

applying, by the information handling system, the transformation matrix to each of the plurality of monolingual embeddings to generate the plurality of multilingual embeddings in the first shared embedding space; and transforming, by the information handling system, the plurality of multilingual embeddings into a plurality of cross-domain, multilingual embeddings in a second shared embedding space with a cross-domain learning process which uses a linear transformation based on a second parallel vocabulary constructed between multiple domains, thereby aligning multiple embeddings of different languages and domains using both continuous embedding training and parallel vocabulary-based linear transformation.

9. The information handling system of claim 8, wherein the set of instructions are executable to transforming the plurality of multilingual embeddings by:
constructing, by the information handling system, the second parallel vocabulary from the plurality of multilingual embeddings;
computing, by the information handling system, a linear transformation using the second parallel vocabulary as anchor points to generate a transformation matrix between each of the plurality of multilingual embeddings and the second shared embedding space; and
applying, by the information handling system, the transformation matrix to each of the plurality of multilingual embeddings to generate the plurality of cross-domain, multilingual embeddings in the second shared embedding space.

10. The information handling system of claim 9, wherein the set of instructions are executable to construct the second parallel vocabulary by:
identifying, by the information handling system, a plurality of stopwords in the plurality of multilingual embeddings that are not domain specific; and
storing, by the information handling system, the stopwords that exist in both a source domain and a target domain as the second parallel vocabulary.

11. The information handling system of claim 8, wherein the set of instructions are executable to perform the actions of:
evaluating, by the information handling system, the plurality of multilingual embeddings to measure a degree to which the plurality of multilingual embeddings associates a set of target concepts with a set of attribute words; and
generating, by the information handling system, an evaluation result for feedback and optimization of the data pre-processing process and/or the cross-lingual learning process.

12. The information handling system of claim 8, wherein the set of instructions are executable to perform actions of:
evaluating, by the information handling system, the plurality of cross-domain, multilingual embeddings to measure a degree to which the plurality of cross-domain, multilingual embeddings associates a set of target concepts with a set of attribute words; and
generating, by the information handling system, an evaluation result for feedback and optimization of the cross-lingual learning process and/or the cross-domain learning process.

13. A computer program product stored in a computer readable storage medium, comprising computer instructions that, when executed by a processor at an information handling system, causes the system to align embeddings of multiple languages and domains into a shared embedding space by:
receiving, by the processor, a plurality of monolingual embeddings trained in a plurality of languages and domains using a data pre-processing process;
extracting, by the processor, a plurality of unigrams from the plurality of monolingual embeddings;
sorting, by the processor, the plurality of unigrams in descending order of frequency of appearance in the plurality of monolingual embeddings;
applying, by the processor, a machine translation process to translate words in the plurality of unigrams from a source language to a target language and from the target language to the source language;
storing, by the processor, translation pairs that exist in both directions between the source language and the target language as a first parallel vocabulary;
computing, by the processor, a linear transformation using the first parallel vocabulary as anchor points to generate a transformation matrix between each of the plurality of monolingual embeddings and the first shared embedding space;
applying, by the processor, the transformation matrix to each of the plurality of monolingual embeddings to generate the plurality of multilingual embeddings in the first shared embedding space; and
transforming, by the processor, the plurality of multilingual embeddings into a plurality of cross-domain, multilingual embeddings in a second shared embedding space with a cross-domain learning process which uses a linear transformation based on a second parallel vocabulary constructed between multiple domains, thereby aligning multiple embeddings of different languages and domains using both continuous embedding training and parallel vocabulary-based linear transformation.

14. The computer program product of claim 13, further comprising computer instructions that, when executed by the system, causes the system to evaluate the plurality of multilingual embeddings by generating, by the information handling system, an evaluation result for feedback and optimization of the data pre-processing process and/or the cross-lingual learning process.

15. The computer program product of claim 13, further comprising computer instructions that, when executed by the system, causes the system:
evaluate, by the processor, the plurality of cross-domain, multilingual embeddings to measure a degree to which the plurality of cross-domain, multilingual embeddings associate a set of target concepts with a set of attribute words; and
generate, by the processor, an evaluation result for feedback and optimization of the cross-lingual learning process and/or the cross-domain learning process.

* * * * *